(12) United States Patent
Gross, IV et al.

(10) Patent No.: US 8,805,788 B2
(45) Date of Patent: Aug. 12, 2014

(54) TRANSACTIONAL VIRTUAL DISK WITH DIFFERENTIAL SNAPSHOTS

(75) Inventors: Jesse Ernest Gross, IV, San Francisco, CA (US); John Whaley, San Mateo, CA (US); Thomas Joseph Purtell, II, Menlo Park, CA (US)

(73) Assignee: Moka5, Inc., Redwood City, CA (US)

( * ) Notice: Subject to any disclaimer, the term of this patent is extended or adjusted under 35 U.S.C. 154(b) by 370 days.

(21) Appl. No.: 12/435,302

(22) Filed: May 4, 2009

(65) Prior Publication Data

US 2010/0280996 A1  Nov. 4, 2010

(51) Int. Cl.
*G06F 17/30* (2006.01)
*G06F 15/16* (2006.01)

(52) U.S. Cl.
USPC ........................................... 707/649; 711/162

(58) Field of Classification Search
CPC .................... G06F 17/30067; G06F 17/30088; G06F 11/2056; G06F 11/1448
USPC ................................................. 707/649, 650
See application file for complete search history.

(56) References Cited

U.S. PATENT DOCUMENTS

| 7,191,304 | B1 * | 3/2007 | Cameron et al. | 711/202 |
| 7,373,451 | B2 | 5/2008 | Lam | |
| 7,428,636 | B1 * | 9/2008 | Waldspurger et al. | 713/164 |
| 2006/0129763 | A1 * | 6/2006 | Royer et al. | 711/118 |
| 2009/0228532 | A1 * | 9/2009 | Anzai | 707/204 |
| 2010/0011178 | A1 * | 1/2010 | Feathergill | 711/162 |

FOREIGN PATENT DOCUMENTS

| WO | 2008005765 A2 | 1/2008 |
| WO | 2008086317 A2 | 7/2008 |

* cited by examiner

*Primary Examiner* — Alex Gofman
(74) *Attorney, Agent, or Firm* — Park, Vaughan, Fleming & Dowler LLP; Chia-Hsin Suen (57) ABSTRACT

Some embodiments provide a system that provides a virtual disk in a computer system. During operation, the system stores data for the virtual disk in a virtual disk file on the computer system. Next, the system loads a differential location data structure corresponding to a snapshot of the virtual disk into memory on the computer system and processes input/output (I/O) operations to the virtual disk using the differential location data structure and the virtual disk file. Finally, the system periodically generates a new snapshot of the virtual disk by transactionally committing changes made to the differential location data structure by the I/O operations to the virtual disk file.

18 Claims, 9 Drawing Sheets

TRANSACTIONAL VIRTUAL DISK WITH DIFFERENTIAL SNAPSHOTS

RELATED APPLICATION

The subject matter of this application is related to the subject matter in a co-pending non-provisional application by inventors John Whaley and Thomas Joseph Purtell II and filed on the same day as the instant application entitled "Interception and Management of I/O Operations on Portable Storage Devices," having Ser. No. 12/435,273, and filed on 4 May 2009.

The subject matter of this application is related to the subject matter in a co-pending non-provisional application by inventors Thomas Joseph Purtell II and John Whaley and filed on the same day as the instant application entitled "Policy-Based Layered Filesystem Management," having Ser. No. 12/435,279, and filed on 4 May 2009.

BACKGROUND

1. Field

The present embodiments relate to techniques for managing virtual disks. More specifically, the present embodiments relate to a method and system for providing virtual disks using transactional and differential snapshots.

2. Related Art

Virtual machines executing on computer systems may be managed from virtual disks in the computer systems. For example, a virtual machine executing a guest operating system on a personal computer may be loaded into memory in the personal computer from a virtual disk in the personal computer. In addition, changes made to the virtual machine and/or snapshots taken of the virtual machine may be stored in the virtual disk so that subsequent execution of the virtual machine may utilize the changes and/or snapshots.

However, current implementations of virtual disks may be inefficient or insecure for a number of reasons. In particular, mappings to data within virtual disks are typically stored in page tables. Such usage of page tables may limit the virtual disks to fixed block sizes and full snapshots of the virtual disks. Furthermore, snapshots of the virtual disks may become increasingly slow as more page tables are used to track changes within the virtual disks.

Virtual disk implementations may also include a number of security vulnerabilities. For example, a virtual disk may be vulnerable to attacks that move and/or modify data within the virtual disk, even if the virtual disk is encrypted. Integrity may also be compromised if the operation of the virtual disk is interrupted. For example, a crash may result in a significant loss of data in the virtual disk, particularly if the virtual disk has not been backed up and/or checkpointed recently.

Hence, what is needed is a mechanism for enhancing the reliability, efficiency, and security of virtual disks.

BRIEF DESCRIPTION OF THE FIGURES

In the figures, like reference numerals refer to the same figure elements.

DETAILED DESCRIPTION

Virtual disks may ideally be used to manage the execution of virtual machines and/or other virtual computing environments on computer systems. For example, a virtual machine containing a guest operating system may be stored within a virtual disk in a computer system. Input/output (I/O) operations to the virtual disk may be made to load the virtual machine into the computer system, execute the virtual machine, and update the virtual machine, just as I/O operations to physical disks are made to execute native operating systems and applications. Furthermore, because data for the virtual disk is stored in a single virtual disk file, the virtual machine may easily be moved to a different location on the computer system or to a different computer system.

Additional improvements to virtual disks may further facilitate the management of virtual machines from the virtual disks. Automatic snapshotting may boost integrity and security by allowing the virtual machine to roll back to a clean state in case of a crash or exploit. Differential snapshots of the virtual disk may further minimize the computational cost and overhead typically associated with taking full virtual machine snapshots, while transactional commits to the virtual disk may ensure that updates to the virtual machine are either successfully made or not made at all. Compression, compaction, encryption, and hash operations performed on individual blocks within the virtual disk may further enhance the efficiency, reliability, throughput, and security of the virtual disk. Finally, space constraints on the virtual disk and/or host filesystem containing the virtual disk may be addressed by resizing the virtual disk.

Embodiments provide a virtual disk in a computer system. Data for the virtual disk may be stored in a virtual disk file on the computer system. In addition, the virtual disk may contain a virtual computing environment executing on the computer system, such as a virtual machine. The virtual computing environment may be loaded into the computer system by reading from the virtual disk. Likewise, changes to the virtual computing environment may be maintained by writing the changes to the virtual disk.

More specifically, embodiments provide a transactional virtual disk with differential snapshots. I/O operations to the virtual disk may be processed using a differential location data structure corresponding to a snapshot of the virtual disk. A read operation to the virtual disk may use the differential location data structure to locate data in the snapshot, and a write operation to the virtual disk may update the differential location data structure with the location of newly written data in the snapshot. Differential snapshots of the virtual disk may be generated by identifying changes made to the differential location data structure and writing the changes to the virtual disk file. Furthermore, the differential snapshots may be transactionally committed to the virtual disk such that each differential snapshot succeeds or is not committed at all.

Figure 1:
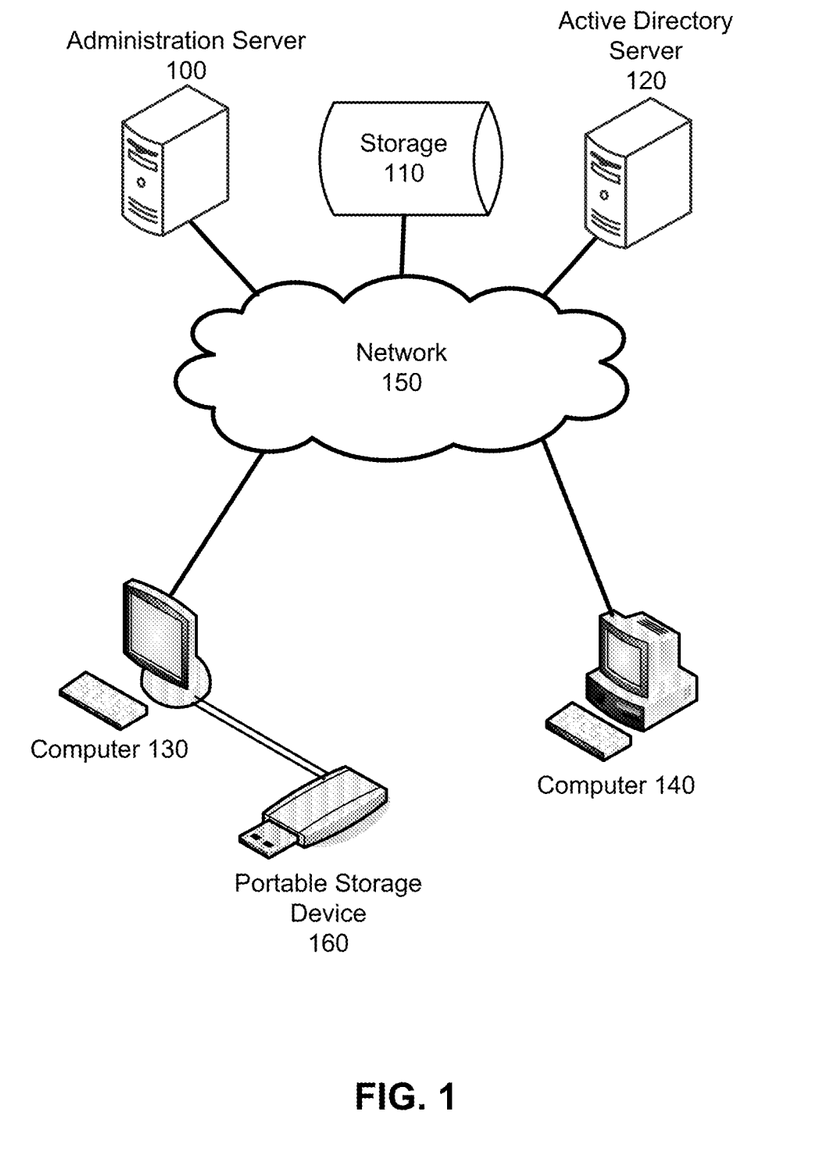
FIG. 1 shows a schematic of a system in accordance with an embodiment.

FIG. 1 shows a schematic of a system in accordance with an embodiment. As shown in FIG. 1, the system includes an administration server 100, storage 110, an active directory server 120, a set of computers 130-140, a network 150, and a portable storage device 160. Each of the components is described in further detail below.

Computers 130-140 may correspond to electronic computing devices that operate as computing devices for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, internet, and/or another type of network that facilitates communication between devices (e.g., administration server 100, storage 110, active directory server 120, computers 130-140) connected to network 150. For example, computers 130-140 may operate as clients in network 150 and allow users of computers 130-140 to send and receive emails, retrieve webpages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux, Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation (Windows), VMware Fusion (Mac) (VMware Fusion™ is a registered trademark of VMware, Inc.), Parallels, and VirtualBox (VirtualBox™ is a registered trademark of Sun Microsystems, Inc.) may be used to provide these capabilities.

In one or more embodiments, the system of FIG. 1 enables the central management and local execution of virtual computing environments. Such central management and local execution may allow virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc. a Delaware corporation). In particular, the MokaFive Player may be used with computers 130-140 to locally execute a centrally defined and managed virtual computing environment according to rules and access controls defined in the MokaFive Server.

In one embodiment, administration server 100 is a server that supports centralized definition of virtual computing environments and management of access and permissions to the same for local execution. For example, administration server 100 may correspond to the MokaFive Server. Administration server 100 may itself execute in a virtual computing environment, (e.g. a VMware ESX environment). For example, an administrator of virtual computing environments for computers 130-140 may create, configure, and delete the virtual computing environments by interacting with administration server 100 through a management interface (e.g., graphical user interface (GUI), web-based user interface, etc.) provided by administration server 100.

In one or more embodiments, active directory server 120 provides network-based directory services. For example, active directory server 120 may correspond to a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies to virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

In particular, each computer 130-140 may include one or more subscriptions to virtual computing environments. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user.

Furthermore, virtual computing environments executing on computers 130-140 may be stored on and/or loaded from portable storage devices (e.g., portable storage device 160) coupled to computers 130-140, including Universal Serial Bus (USB) flash drives, flash memory cards, and/or portable computing devices (e.g., mobile phones, portable media players, etc.). Portable storage device 160 may also include virtualization software (e.g., hypervisors), subscription information, user data, and/or other information required to load the virtual computing environments into any compatible computer (e.g., x86 computers) without pre-installation of software on the computer.

In other words, the virtual computing environments and all information and software required to execute the virtual computing environments may be loaded, stored, and managed entirely from portable storage device 160 instead of from computers 130-140 and/or network 150. Management of virtual computing environments from portable storage devices is described in a co-pending non-provisional application by inventors John Whaley and Thomas Joseph Purtell II and filed on the same day as the instant application entitled "Interception and Management of I/O Operations on Portable Storage Devices," having Ser. No. 12/435,273, and filing date 04 May 2009, which is incorporated herein by reference.

In one or more embodiments, virtual computing environments on computers 130-140 are loaded, executed, and updated from virtual disks in computers 130-140. The virtual disks may correspond to files on computers 130-140 that appear as physical disk drives to computers 130-140. Because data for each virtual disk is stored in one or more files, the virtual disk may be easily transferred between computers 130-140, storage 110, administration server 100, and/or other devices connected to network 150. Easy transfer of virtual disks between devices may additionally enhance the deployment of the virtual computing environments to computers 130-140 from network 150, as well as the backup of the virtual computing environments on storage 110 and/or other storage mechanisms.

To further facilitate the management of the virtual computing environments from the virtual disks, the virtual disks may provide features such as periodic differential snapshots; transactional commits of snapshots; and block-level encryption, compaction, compression, and hash operations. Such features may enable efficient updates and backups of the virtual machines to be conducted between computers 130-140 and storage 110 and may provide additional security, reliability, integrity, and space savings in executing the virtual computing environments on computers 130-140.

Figure 2:
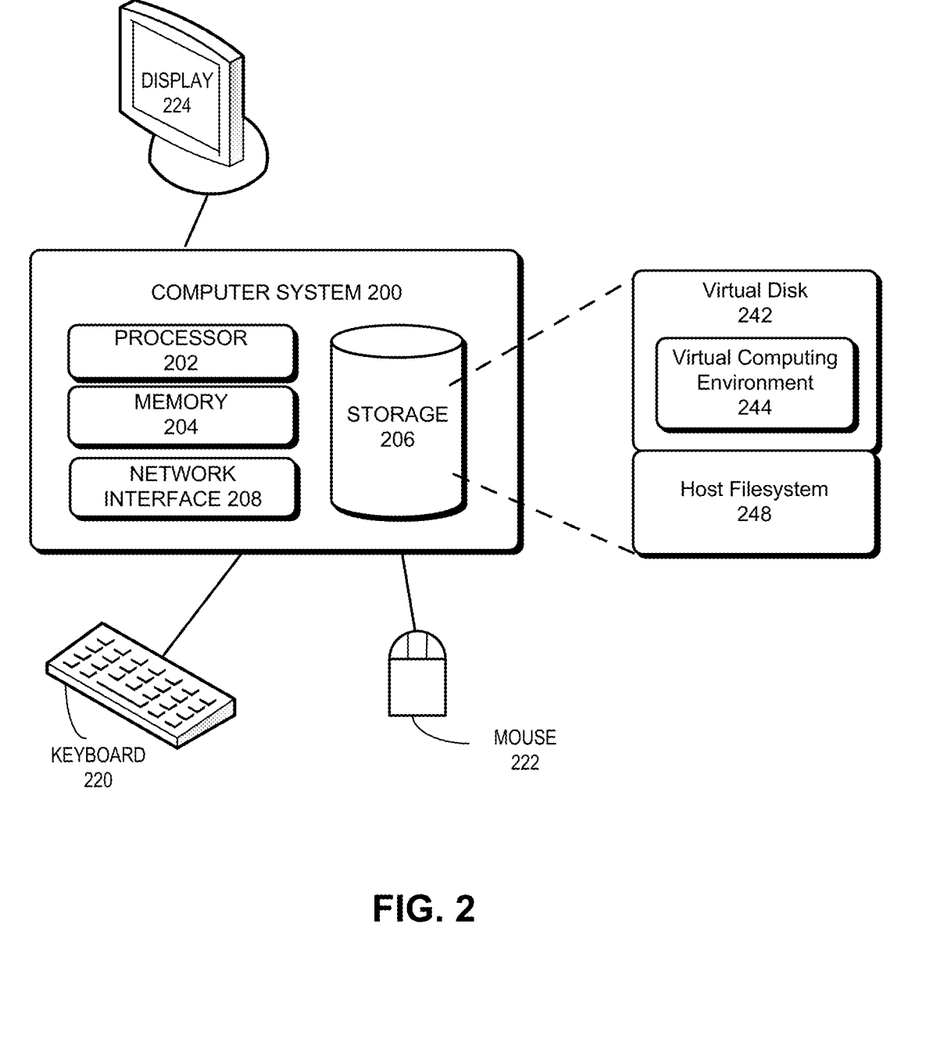
FIG. 2 shows a computer system in accordance with an embodiment.

FIG. 2 shows a computer system 200 in accordance with an embodiment. Computer system 200 may correspond to an electronic computing device (e.g., computers 130-140 of FIG. 1) that is connected to a network, such as network 150 of FIG. 1. Computer system 200 includes a processor 202, memory 204, storage 206, network interface 208, and/or other components found in electronic computing devices. Processor 202 may support parallel processing and/or multi-threaded operation with other processors in computer system 200. Computer system 200 may also include input/output (I/O) devices such as a keyboard 220, a mouse 222, and a display 224.

Computer system 200 may include functionality to execute various components of the present embodiments. Computer system 200 may include a host operating system (not shown) that coordinates the use of hardware and software resources on computer system 200, as well as one or more applications that perform specialized tasks for the user. To perform tasks for the user, applications may obtain the use of hardware resources on computer system 200 from the host operating system, as well as interact with the user through a hardware and/or software framework provided by the host operating system.

In particular, computer system 200 may manage the execution of a virtual computing environment 244 from a virtual disk 242. Virtual disk 242 may exist separately from a host filesystem 248 in computer system 200 and appear as a physical disk to computer system 200. Alternatively, virtual disk 242 may be stored in one or more files in host filesystem 248. Virtual disk 242 may be obtained from network-accessible storage (e.g., storage 110 of FIG. 1) using network interface 208 according to instructions specified by an administration server (e.g., administration server 100 of FIG. 1). A hypervisor (not shown) on computer system 200 may then load virtual computing environment 244 into computer system 200 from virtual disk 242 for local execution of virtual computing environment 244 on computer system 200.

In one or more embodiments, the hypervisor corresponds to a hosted hypervisor (e.g., type II hypervisor) that runs within the host operating system and obtains resources for the domains through the host operating system. Alternatively, the hypervisor may function as a native hypervisor (e.g., type I hypervisor) that runs directly on hardware in computer system 200. The hypervisor may also be referred to as a virtual machine monitor. For example, the hypervisor may include the MokaFive Player.

Within computer system 200, virtual computing environment 244 may execute independently of a network connection with the administration server and/or storage, subject to any security policies defined for virtual computing environment 244 on the administration server. Alternatively, virtual computing environment 244 may require an intermittent and/or constant connection to the network as specified by a security policy on the administration server. For example, virtual computing environment 244 may continue executing on computer system 200 only if computer system 200 is capable of communicating with the administration server on a periodic basis (e.g., weekly). Such periodic communication may be required to enforce security in virtual computing environment 244 and/or to enable remote termination of virtual computing environment 244 from the administration server. A network connection may also be required for updates to virtual computing environment 244 to be received by computer system 200 from the network in accordance with a notification from the administration server.

In one or more embodiments, virtual disk 242 manages the execution of virtual computing environment 244 by tracking changes made to virtual computing environment 244 during execution. In particular, virtual disk 242 may store changes to virtual computing environment 244 using a set of snapshots. Each snapshot may save the state of virtual computing environment 244 at a particular time in the execution of virtual computing environment 244. Snapshots of virtual disk 242 may thus allow virtual computing environment 244 to maintain state between uses by loading from the most recent snapshot and to recover from crashes, exploits, and/or other problems by reverting to a previous snapshot.

In one or more embodiments, virtual disk 242 includes functionality to generate differential snapshots of virtual computing environment 244. The differential snapshots may track changes to virtual computing environment 244 while minimizing overhead and space requirements associated with storing and transmitting full snapshots of virtual computing environment 244. In addition, the differential snapshots may be transactionally committed to virtual disk 242 such that each differential snapshot is either stored successfully in virtual disk 242 or not stored at all. Updates to virtual computing environment 244 may also be efficiently obtained from the network as differential snapshots that only contain differences between virtual computing environment 244 in virtual disk 242 and a master image of virtual computing environment 244 on the network. Likewise, efficient backups of virtual computing environment 244 may be sent to network-accessible storage as differential snapshots that contain only changes made to virtual computing environment 244 since the most recent backup.

Virtual disk 242 may provide additional features that further enhance the reliability, security, integrity, and portability of virtual computing environment 244. Such features may include block-level encryption, compression, compaction, and hashes; caching and prefetch of blocks; linking of blocks for tamper resistance; resizing of virtual disk files; and/or buffering of write operations. The operation and functionality of virtual disk 242 is discussed in below with respect to FIGS. 3-4.

Virtual disk 242 may also be used to load, store, and manage data not associated with virtual computing environment 244. For example, virtual disk 242 may enable access to remote data storage over the network, manage changes to native applications and/or files on computer system 200, and/or serve as a backup for a physical disk (e.g., compact disk (CD), digital video disk (DVD), floppy disk, etc.).

Figure 3:
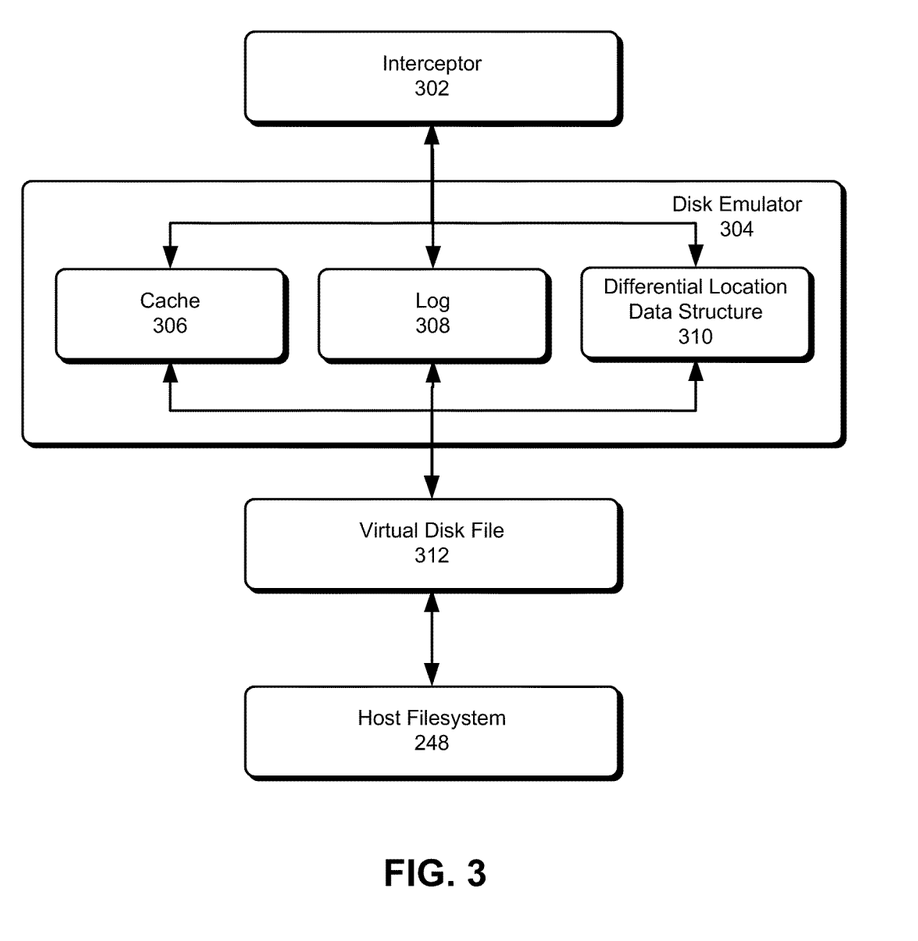
FIG. 3 shows a system for providing a virtual disk in a computer system in accordance with an embodiment.

FIG. 3 shows a system for providing a virtual disk (e.g., virtual disk 242 of FIG. 2) in a computer system (e.g., computer system 200 of FIG. 2) in accordance with an embodiment. In particular, the system of FIG. 3 includes an interceptor 302 a disk emulator 304, and a virtual disk file 312. Disk emulator 304 includes a cache 306, a log 308, and a differential location data structure 310.

In one or more embodiments, virtual disk file 312 stores data for the virtual disk. In other words, virtual disk file 312 may correspond to a single file on host filesystem 248 that contains data for multiple files, applications, settings, and/or other types of data managed by the virtual disk. Alternatively, data for the virtual disk may be stored in multiple virtual disk files on host filesystem 248. For example, data for the virtual disk may be stored in three different virtual disk files, each with a different set of encryption, compression, and/or snapshotting parameters.

To improve security, reliability, space savings, and throughput in the virtual disk, individual blocks in virtual disk file 312 may be cached, encrypted, compressed, compacted, and/or hashed. For example, the contents of virtual disk file 312 may be encrypted using a key for the virtual disk and a different initialization vector for each block. In addition, the message authentication code (MAC) and/or hash of each block may include a unique set of identifiers (IDs) for the block to prevent blocks from being moved in virtual disk file 312. Furthermore, integrity may be verified by storing the MAC and/or hash in a parent block that references the block. If the block has been tampered with, the MAC and/or hash computed from the block may no longer match the MAC and/or hash stored in the parent block.

Both throughput and space savings may be improved by selecting a compression technique, compression strength, and/or compression parameters such that the compression and decompression of data in virtual disk file 312 occur more quickly than the transfer of data from the physical disk on which virtual disk file 312 is stored. For example, virtual disk file 312 may be stored on a hard disk drive with a disk speed of 80 MB/s. A compression technique with a compression factor of 2 and a compression speed of 200 MB/s may double the effective data transfer speed of the hard disk drive to 160 MB/s while halving the size of virtual disk file 312 on the hard disk drive.

Compaction may provide additional space savings by facilitating the creation of contiguous blocks of storage within virtual disk file 312. Compaction may be performed by moving blocks to adjacent locations so that the remaining free space in virtual disk file 312 is contiguous. Compaction may also include coalescing the contents of two or more blocks with overlapping or contiguous data ranges.

Finally, recently used blocks from virtual disk file 312 may be stored in an in-memory cache 306 for faster access. Cache 306 may also be used to prefetch blocks based on common access patterns for reading blocks from virtual disk file 312. For example, the loading of an operating system from virtual disk file 312 may involve a specific access pattern of reads to virtual disk file 312. Subsequent loads of the operating system may be facilitated by obtaining blocks in the access pattern ahead of time and storing the blocks in cache 306 so that the operating system loads by reading from cache 306 instead of from virtual disk file 312. If the blocks are encrypted and/or compressed in virtual disk file 312, the blocks may be decrypted and/or decompressed before the blocks are loaded into cache 306.

As mentioned previously, the virtual disk may appear as a physical disk on the computer system. As a result, I/O operations to the virtual disk may utilize the same interfaces (e.g., Integrated Drive Electronics (IDE), Small Computer System Interface (SCSI), Serial ATA (SATA)) as I/O operations to physical disks on the computer system. To produce the appearance of a physical disk, interceptor 302 may intercept I/O operations to the virtual disk from the computer system. For example, interceptor 302 may intercept I/O operations from a virtual computing environment (e.g., virtual computing environment 244 of FIG. 2) executing on the computer system. Interceptor 302 may be implemented as a kernel driver, filesystem driver, partition driver, and/or disk driver on the computer system. Interceptor 302 may also be implemented as a shim in host filesystem 248 and/or on hardware in the computer system.

Disk emulator 304 may then process the I/O operations using cache 306, log 308, and/or differential location data structure 310. To process I/O operations to the virtual disk, disk emulator 304 may use differential location data structure 310 to locate blocks of data in virtual disk file 312. In one or more embodiments, differential location data structure 310 corresponds to a snapshot (e.g., image) of the virtual disk. More specifically, differential location data structure 310 may map blocks in the snapshot to blocks in virtual disk file 312. The mapping may be stored in a binary tree, a B-tree, a page table, a linked list, and/or other data structure used to sort and manage blocks of data. For example, differential location data structure 310 may be implemented using a dynamic data structure such as a B-tree to enable the use of variable-sized blocks (e.g., extents) in the virtual disk.

In one or more embodiments, disk emulator 304 loads differential location data structure 310 into memory on the computer system. To generate differential location data structure 310 within the memory, disk emulator 304 may obtain metadata associated with a snapshot of the virtual disk from virtual disk file 312 and populate differential location data structure 310 with the metadata. Disk emulator 304 may also use metadata in virtual disk file 312 to generate in-memory data structures associated with block allocation and freeing.

In particular, disk emulator 304 may create a free list and a block list from the metadata; the free list may contain unused blocks in virtual disk file 312, while the block list may contain blocks that are used by live (e.g., stored) snapshots of the virtual disk. In other words, the free list and block list may correspond to complementary sets of blocks within virtual disk file 312. As with differential location data structure 310, the free list and/or block list may be represented using a variety of data structures, including bitmaps, B-trees, AVL trees, and/or linked lists.

To allocate a block (e.g., in a write operation), disk emulator 304 may search the free list to find an appropriate block and/or extent. For example, disk emulator 304 may select the block based on the block's size, position in the free list, and/or other criteria. Disk emulator 304 may then perform the allocation by removing the block from the free list and adding the block to the block list. Conversely, garbage collection of blocks in virtual disk file 312 may be accomplished by searching the block list for blocks that are not referenced by live snapshots of the virtual disk, removing the blocks from the block list, and adding the blocks to the free list.

Consequently, differential location data structure 310 may allow disk emulator 304 to present the virtual disk as a physical disk on the computer system by maintaining an image of the virtual disk along with a mapping of the image to blocks in virtual disk file 312. I/O operations to the virtual disk may be performed using the mapping in differential location data structure 310. Additional data structures such as the free list and/or block list may further assist disk emulator 304 in performing I/O operations to the virtual disk.

To perform a read operation, disk emulator 304 may locate a set of blocks requested in the read operation using differential location data structure 310 and then retrieve the blocks from virtual disk file 312. Disk emulator 304 may also decrypt, decompress, and/or perform a hash or integrity check associated with each requested block before returning with data from the blocks.

To perform a write operation, disk emulator 304 may compress, encrypt, and/or compute a hash for a block of data to be written to virtual disk file 312. Disk emulator 304 may also allocate space in virtual disk file 312 based on the block size of the block after any compression or encryption is performed. To execute the write operation, disk emulator 304 may write the block to the space and update differential location data structure 310 with the block. In other words, disk emulator 304 may write data for the virtual disk to virtual disk file 312 and then enable subsequent use of the data by referencing the data in an image of the virtual disk.

Disk emulator 304 may also store write operations in log 308 prior to processing the write operations. Log 308 may be located in main memory on the computer system, in a physical drive (e.g., hard disk drive) on the computer system, and/or in another storage mechanism on the computer system. In addition, I/O operations in log 308 may be processed in the order in which the I/O operations were received by interceptor 302 and/or written to log 308. As a result, log 308 may correspond to a queue or buffer of I/O operations to be processed by disk emulator 304. Write operations may be coalesced in log 308 by interceptor 302 until log 308 reaches a predetermined capacity and/or a period of time has elapsed (e.g., 30 seconds). The write operations may then be processed as a batch by disk emulator 304 to improve performance.

However, write operations and/or other changes to the virtual disk may not be persisted in virtual disk file 312 until a snapshot is made of the virtual disk. For example, changes to the virtual disk may be committed to virtual disk file 312 by taking a snapshot of the virtual disk periodically (e.g., every 30 seconds) and/or manually. Accordingly, snapshots may serve as the mechanism by which data in the virtual disk is stored, accessed, and updated.

In one or more embodiments, snapshots of the virtual disk are generated as differential snapshots by disk emulator 304. To generate differential snapshots, disk emulator 304 may identify changes made to differential location data structure 310 and write the changes to a space in virtual disk file 312. For example, if differential location data structure 310 corresponds to a B-tree, changes to differential location data structure 310 may be represented by dirty nodes in the B-tree. Changes to the B-tree may thus be obtained by walking the B-tree and collecting the dirty nodes.

Furthermore, differential snapshots may be transactionally committed to virtual disk file 312 by disk emulator 304. First, disk emulator 304 may ensure that writes associated with the differential snapshot to virtual disk file 312 have completed. For example, disk emulator 304 may use an "fsync" method call to ensure that write operations, compaction, and/or other changes to virtual disk file 312 have completed before committing the differential snapshot. To commit the differential snapshot, disk emulator 304 may update a checkpoint region in virtual disk file 312 to reference the metadata containing the changes to differential location data structure 310. As discussed below with respect to FIG. 4, the checkpoint region may contain references to live snapshots in the virtual disk. If the checkpoint region does not contain a reference to a particular snapshot, the snapshot effectively does not exist in the virtual disk. Thus, the differential snapshot may be successfully committed to virtual disk file 312 if the checkpoint region is updated with a reference to the differential snapshot and not committed at all if the checkpoint region is not updated with the reference.

Data integrity of the virtual disk may further be enhanced using the following mechanisms. When writes to the virtual disk have completed (e.g., when the computer system signals to the virtual disk 242 that the filesystem is in a consistent state), disk emulator 304 may initiate a snapshot. Furthermore, when a periodic or manual snapshot is initiated, disk emulator 304 may wait a short amount of time for the computer system to signal that the filesystem is in a consistent state before performing the snapshot.

The combined operation of interceptor 302 and disk emulator 304 may thus provide a virtual disk for use by the computer system. Moreover, the functionality of interceptor 302 and disk emulator 304 may be implemented in multiple ways. For example, interceptor 302 and disk emulator 304 may execute as separate applications, processes, and/or modules on the computer system. Features of interceptor 302 and disk emulator 304 may be interchanged between the two modules and/or provided by a third module. For example, some of the aforementioned functionality of disk emulator 304 may be provided by interceptor 302 and/or another application or process in the computer system. Alternatively, interceptor 302 and disk emulator 304 may be included in a single application or process that mediates I/O operations between the computer system and virtual disk and maps data in the virtual disk to blocks in virtual disk file 312.

Furthermore, the virtual disk of FIG. 3 may be interoperable with a portable storage device, such as portable storage device 160 of FIG. 1. As discussed above and in the above-referenced application, a virtual computing environment may be loaded from either the virtual disk or the portable storage device. Interceptor 302 and/or disk emulator 304 may thus include mechanisms for transferring and synchronizing data between the virtual disk and portable storage device. For example, the virtual computing environment may be copied from the portable storage device to the virtual disk and loaded from the virtual disk. Changes made to the virtual disk during execution may be propagated to the portable storage device to maintain an updated state of the virtual computing environment on the portable storage device.

The virtual disk may additionally be used as a mechanism for storing and organizing data (e.g., for the virtual computing environment) on the portable storage device. The virtual disk (e.g., interceptor 302, disk emulator 304, virtual disk file 312) may be transferred from the portable storage device to physical storage (e.g., hard disk drive) on the computer system and loaded from the physical storage. Changes to the virtual disk on the physical storage may then be copied back to the portable storage device to synchronize data between multiple copies of the virtual disk. On the other hand, virtual disk file 312 may continue to reside on the portable storage device as interceptor 302 and disk emulator 304 are loaded on the computer system and used to provide the virtual disk to the computer system. I/O operations to virtual disk file 312 on the portable storage device may be mediated by interceptor 302 and/or disk emulator 304, as well as mechanisms described in the above-referenced application for decoupling I/O operations to the portable storage device.

Figure 4:
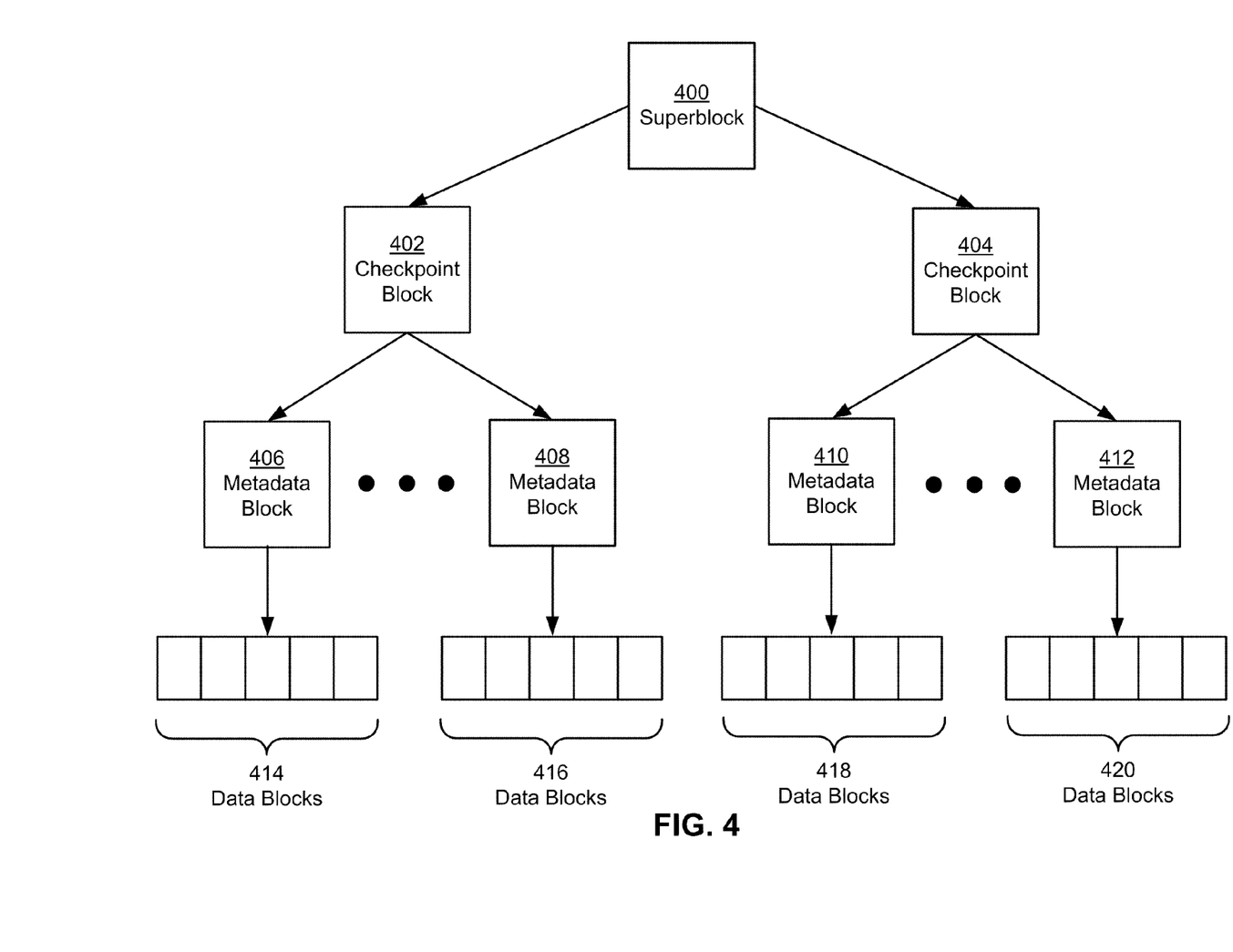
FIG. 4 shows a virtual disk file in accordance with an embodiment.

FIG. 4 shows a virtual disk file (e.g., virtual disk file 312 of FIG. 3) in accordance with an embodiment. The virtual disk file may be used to store data for a virtual disk (e.g., virtual disk 242 of FIG. 2). As shown in FIG. 4, the virtual disk file includes a superblock 400, two checkpoint blocks 402-404, a set of metadata blocks 406-412, and a set of data blocks 414-420.

Superblock 400 may contain static configuration data associated with the virtual disk. For example, superblock 400 may include a disk size, version, serial number, parent file information, encryption information (e.g., encryption type, index to encryption keys, etc.), compression information, and/or other properties of the virtual disk. Superblock 400 may also enable access to the virtual disk file by acting as the starting point for a chain of references to all used blocks in the virtual disk file. In particular, superblock 400 may correspond to a parent block of checkpoint blocks 402-404 by referencing (e.g., pointing to) checkpoint blocks 402-404, which may serve as parent blocks to metadata blocks 406-412 that in turn reference data blocks 414-420 in the virtual disk file.

Because superblock 400 may store information regarding the encryption and compression of blocks in the virtual disk, superblock 400 itself may not be compressed or encrypted. On the other hand, blocks in the virtual disk file that are encrypted and/or compressed may contain additional encryption and/or compression information, such as encryption headers with initialization vectors and/or uncompressed block sizes. In addition, superblock 400 and all other blocks in the virtual disk may include a hash, checksum, unique identifier, and/or MAC to verify the integrity of each block's contents. To facilitate tamper resistance, the hash, checksum, unique identifier, and/or MAC for a block may be stored in the block's parent for improved tamper resistance. For example, a hash for metadata block 406 may be stored in checkpoint block 402 so that tampering of metadata block 406 may be detected by calculating the hash for metadata block 406 and comparing the calculated hash with the hash stored in checkpoint block 402. The hash, checksum, unique identifier, and/or MAC may also be stored at multiple locations within the block to detect incomplete writes. For example, a unique identifier for metadata block 406 may be stored at the beginning and the end of metadata block 406 to detect incomplete write operations to metadata block 406.

Checkpoint blocks 402-404 may form a checkpoint region in the virtual disk file. As mentioned previously, the checkpoint region may store information about live (e.g., active) snapshots in the virtual disk. Each checkpoint block 402-404 may include a checkpoint ID, a number of snapshots referenced by the checkpoint block, and an active snapshot list. Each entry in the active snapshot list may correspond to an active snapshot in the virtual disk and include a reference to a metadata block 406-412 representing the snapshot and a length of the metadata block, as well as other information related to the snapshot (e.g., manual/automatic snapshot, differential/full snapshot). The entry may also include a snapshot ID that identifies the snapshot in relation to other snapshots stored in checkpoint blocks 402-404. For example, snapshot IDs for snapshots may correspond to integer values that increase monotonically with time, allowing entries in the active snapshot list to be chronologically ordered. Chronological ordering of snapshots may further cause older snapshots in the active snapshot list to be discarded as new snapshots are added to the active snapshot list.

Each metadata block 406-412 may contain information (e.g., metadata) describing a snapshot of the virtual disk. For example, each metadata block 406-412 may include a block list of data blocks (e.g., data blocks 414-420) used in the snapshot, as well as an uncompressed size of the list if the list is compressed. Each entry in the block list may contain information about a data block in the snapshot, such as a reference to the data block, a length of the data block, a snapshot ID of the most recent snapshot in which the data block was updated, and/or a sequence number identifying the data block within a given snapshot version.

Finally, data blocks 414-420 may contain data for the virtual disk. Used data blocks may be referenced by one or more metadata blocks 406-412, while unused blocks may not be referenced by other blocks in the virtual disk file. References to data blocks 414-420 may be used to construct a free list of unused blocks and a block list of used blocks. Furthermore, the free list and block list may be used to allocate blocks in the virtual disk file (e.g., for write operations) and reclaim blocks that have been de-referenced (e.g., from discarded snapshots).

In one or more embodiments, information from one or more metadata blocks 406-412 is used to generate a differential location data structure (e.g., differential location data structure 310 of FIG. 3). The differential location data structure may correspond to an in-memory representation of a snapshot that maps blocks in the snapshot to data blocks 414-420 used by the snapshot in the virtual disk file. The differential location data structure may also facilitate the processing of I/O operations to the virtual disk file. In particular, a read operation to the virtual disk may be processed by locating one or more data blocks 414-420 requested in the read operation using the differential location data structure, and retrieving the contents of the requested data blocks. Likewise, a write operation to the virtual disk may be processed by allocating one or more unused data blocks (e.g., from a free list), writing to the allocated data block(s), and updating the differential location data structure with the data block(s). As a result, the differential location data structure may both enable access to data blocks 414-420 (e.g., in read operations) and record changes to data blocks 414-420 (e.g., in write operations).

In addition, new snapshots of the virtual disk may be generated from the differential location data structure. Each new snapshot may be generated by identifying changes made to the differential location data structure, allocating a new metadata block (e.g., metadata blocks 406-412) for the changes, and saving the changes to the new metadata block. Because only changes made to the virtual disk between snapshots are saved in new snapshots, snapshots in the virtual disk may correspond to differential snapshots. Differential snapshots in the virtual disk may require significantly less space and overhead than full snapshots of the virtual disk, which in turn may allow snapshots of the virtual disk to be taken more frequently and efficiently than snapshots in conventional virtual disk implementations.

New snapshots may also be transactionally committed to the virtual disk file by alternately updating checkpoint blocks 402-404 with references to metadata blocks (e.g., metadata blocks 406-412) containing the new snapshots. For example, if snapshot IDs correspond to integer values that increment by 1 each time a new snapshot is generated, checkpoint block 402 may only reference metadata blocks with odd-numbered snapshot IDs, while checkpoint block 404 may only reference metadata blocks with even-numbered snapshot IDs.

More specifically, a snapshot may be transactionally committed by adding an entry for a metadata block containing the snapshot to the active snapshot list of a checkpoint block 402-404. To enforce transactionality, the entry may not be added until all writes to the virtual disk file (e.g., write operations, compaction, etc.) have completed. Because the snapshot (e.g., metadata block) may be inaccessible from the virtual disk file unless the snapshot is referenced in a checkpoint block 402-404, the snapshot is either successfully committed to the virtual disk file or not at all. As a result, crashes and other interruptions to the operation of the virtual disk may be remedied by loading the virtual disk from the most recent successful snapshot. Similarly, writing to checkpoint blocks 402-404 on an alternating basis may ensure that at least one checkpoint block contains valid data if a write to a checkpoint block fails or is interrupted.

Figure 5:
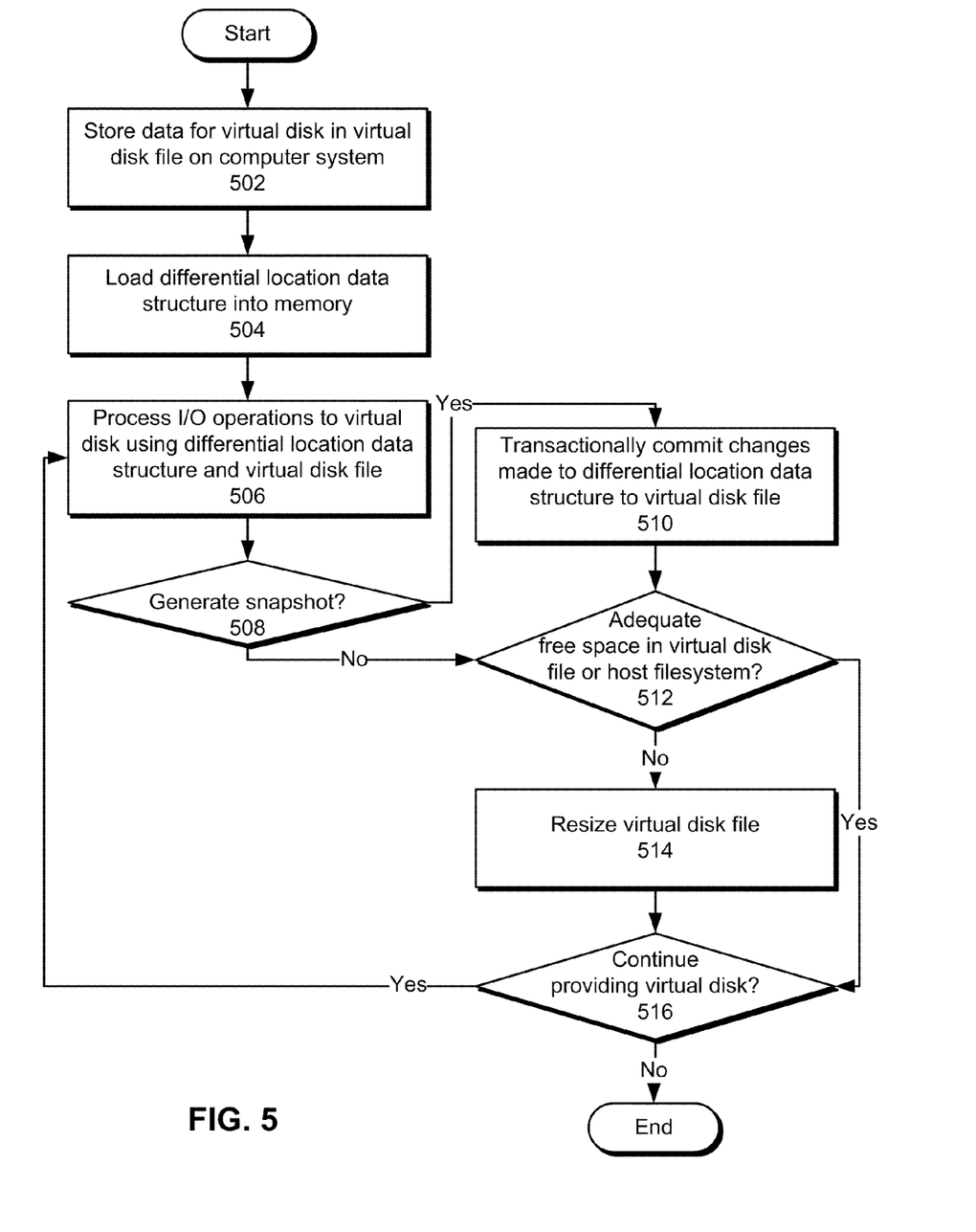
FIG. 5 shows a flowchart illustrating the process of providing a virtual disk in a computer system in accordance with an embodiment.

FIG. 5 shows a flowchart illustrating the process of providing a virtual disk in a computer system in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, data for the virtual disk is stored in a virtual disk file on the computer system (operation 502). Next, a differential location data structure is loaded into memory on the computer system (operation 504). The differential location data structure may be generated from metadata for a snapshot of the virtual disk. In addition, the differential location data structure may map blocks in the snapshot to blocks in the virtual disk file.

The differential location data structure and virtual disk file may be used to process I/O operations to the virtual disk (operation 506). The I/O operations may include read operations that use the differential location data structure to locate blocks in the virtual disk file, as well as write operations that update the differential location data structure with newly written blocks in the virtual disk file.

A snapshot of the virtual disk may also be generated (operation 508) to persist changes made to the differential location data structure to the virtual disk file. For example, snapshots may be taken periodically (e.g., every 30 seconds) and/or manually (e.g., user-initiated) to maintain the state of the virtual disk in the virtual disk file. To generate a snapshot, changes made to the differential location data structure are transactionally committed to the virtual disk file (operation 510). Along the same lines, adequate free space in the virtual disk file and/or host filesystem on the computer system may be monitored (operation 512), and the virtual disk file may be resized (operation 514). In particular, the virtual disk file may be enlarged if the virtual disk file is running out of free space for write operations. Conversely, the virtual disk file may be reduced in size if filesystem free space on the computer system is adversely affected by the amount of space occupied by the virtual disk file.

The virtual disk may continue to be provided (operation 516) during use of the virtual disk. For example, the virtual disk may contain a virtualized computing environment that executes on the computer system. Consequently, the virtual disk may be provided for use by the virtual computing environment during execution of the virtualized computing environment. If the virtual disk continues to be provided, I/O operations to the virtual disk are processed using the differential location data structure and virtual disk file (operation 506). Furthermore, snapshots of the virtual disk are generated periodically and/or manually (operations 508-510), and the virtual disk resized if free space in the virtual disk file and/or host filesystem is not adequate (operations 512-516). Operations 506-516 may continue until the virtual disk is no longer provided.

Figure 6:
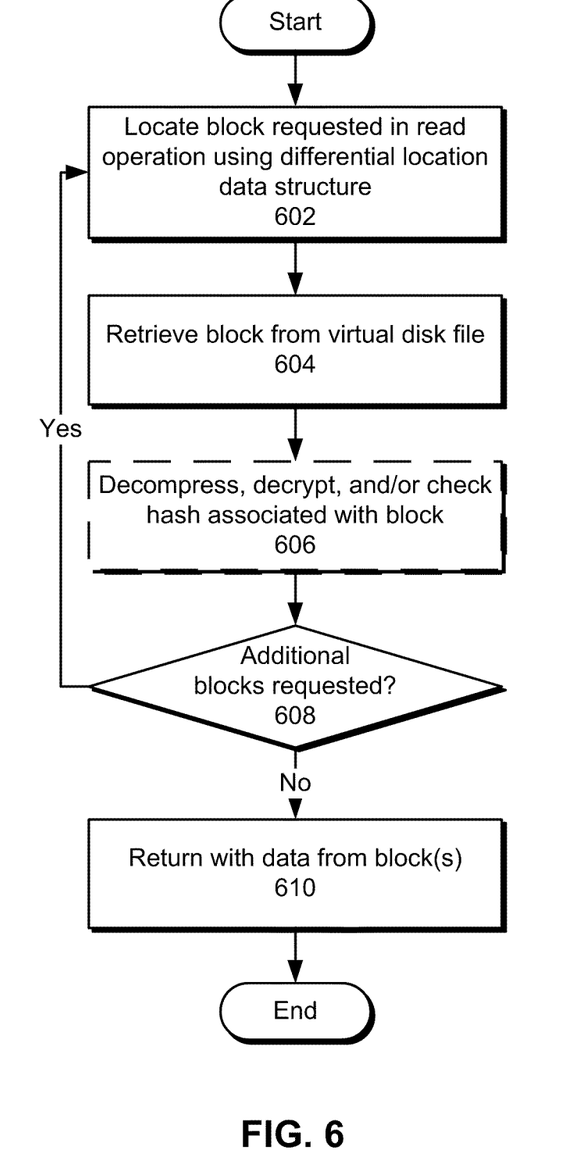
FIG. 6 shows a flowchart illustrating the processing of a read operation to a virtual disk in accordance with an embodiment.

FIG. 6 shows a flowchart illustrating the processing of a read operation to a virtual disk in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

To perform the read operation, a block requested in the read operation is located using a differential location data structure (operation 602). Next, the block is retrieved from a virtual disk file (operation 604) containing data for the virtual disk. Optionally, decompression, decryption, and/or hash checking operations may be performed on the block (operation 606) if the block is compressed, encrypted, and/or hashed.

Additional blocks may also be requested in the read operation (operation 608). If additional blocks are requested, each block is located using the differential location data structure (operation 602) and retrieved from the virtual disk file (operation 604). If applicable, the block is also decompressed, decrypted, and/or hash verified (operation 606). Data from the requested block(s) is then returned (operation 610) to conclude the read operation.

Figure 7:
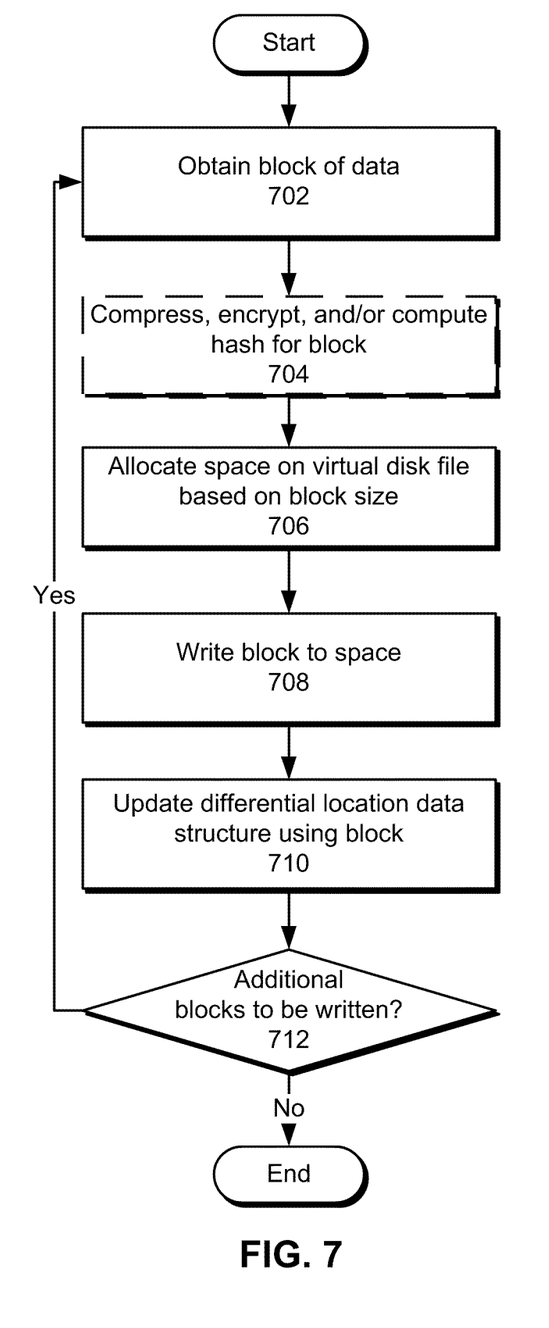
FIG. 7 shows a flowchart illustrating the processing of a write operation to a virtual disk in accordance with an embodiment.

FIG. 7 shows a flowchart illustrating the processing of a write operation to a virtual disk in accordance with an embodiment. In one or more embodiments, one or more of the steps may be omitted, repeated, and/or performed in a different order. Accordingly, the specific arrangement of steps shown in FIG. 7 should not be construed as limiting the scope of the embodiments.

To perform the write operation, a block of data associated with the write operation is obtained (operation 702). The block may be obtained from the write operation and/or from a log (e.g., buffer) containing the write operation. The block may optionally be compressed, encrypted, and/or hashed (operation 704). Next, a space on a virtual disk file is allocated based on a block size of the block (operation 706), and the block is written to the space (operation 708). A differential location data structure is then updated using the block (operation 710) to record the write in the virtual disk file.

Additional blocks may also be written (operation 712) to the virtual disk file. For example, the additional blocks may be obtained from a log that coalesces multiple write operations for batch processing. If additional blocks are to be written, each block is obtained (operation 702) and optionally compressed, encrypted, and/or hashed (operation 704). A space on the virtual disk file is allocated based on the block size of the block (operation 706), and the block is written to the space (operation 708). The differential location data structure is then updated using the block (operation 710). The write operation may conclude when all blocks associated with the write operation have been written to the virtual disk file and recorded in the differential location data structure.

Figure 8:
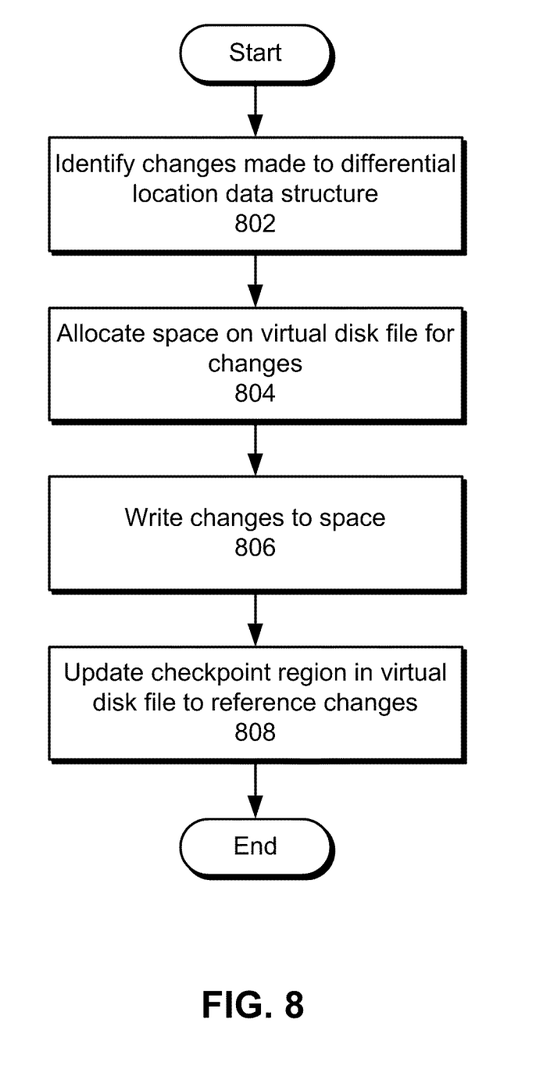
FIG. 8 shows a flowchart illustrating the process of generating a snapshot of a virtual disk in accordance with an embodiment.

FIG. 8 shows a flowchart illustrating the process of generating a snapshot of a virtual disk in accordance with an embodiment. In one or more embodiments, one or more of the steps may be omitted, repeated, and/or performed in a different order. Accordingly, the specific arrangement of steps shown in FIG. 8 should not be construed as limiting the scope of the embodiments.

Initially, changes made to a differential location data structure are identified (operation 802). The differential location data structure may correspond to an existing snapshot of the virtual disk, along with changes made to the virtual disk since the existing snapshot was taken. For example, the differential location data structure may correspond to a B-tree of blocks in the virtual disk, with changes represented by dirty nodes in the B-tree. To identify the changes in the B-tree, the B-tree may be traversed and the dirty nodes may be collected from the B-tree.

Next, a space on a virtual disk file is allocated for the changes (operation 804), and the changes are written to the space (operation 806). For example, the space may correspond to a metadata block (e.g., metadata blocks 406-412 of FIG. 4) in the virtual disk file. The changes may be written to the metadata block as a list of references to data blocks (e.g., data blocks 414-420 of FIG. 4) in the virtual disk file that have changed since the last existing snapshot.

Finally, the changes may be transactionally committed by updating a checkpoint region in the virtual disk file to reference the changes (operation 808). As described above, snapshots in the virtual disk file may only be accessed from the checkpoint region (e.g., checkpoint blocks 402-404 of FIG. 4), such that snapshots that are not referenced by the checkpoint region effectively do not exist in the virtual disk. Consequently, the snapshot is either successfully committed to the virtual disk file if the checkpoint region is updated to reference the snapshot, or the snapshot is not committed at all.

Figure 9:
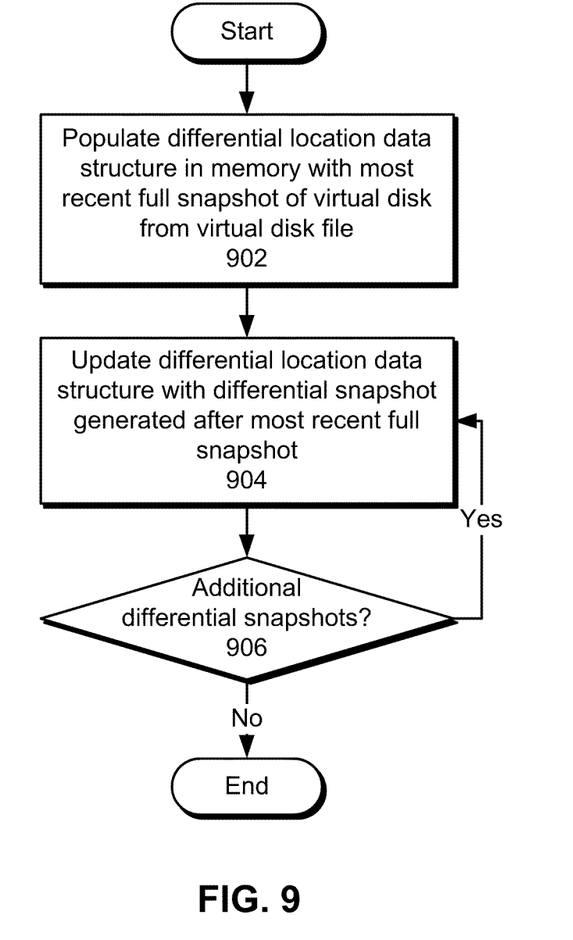
FIG. 9 shows a flowchart illustrating the process of loading a differential location data structure into memory on a computer system in accordance with an embodiment.

FIG. 9 shows a flowchart illustrating the process of loading a differential location data structure into memory on a computer system in accordance with an embodiment. In one or more embodiments, one or more of the steps may be omitted, repeated, and/or performed in a different order. Accordingly, the specific arrangement of steps shown in FIG. 9 should not be construed as limiting the scope of the embodiments.

Initially, the differential location data structure is populated in memory with the most recent full snapshot of a virtual disk from a virtual disk file (operation 902). For example, metadata for the full snapshot may be used to populate a B-tree corresponding to the differential location data structure. Next, the differential location data structure is updated with a differential snapshot generated after the most recent full snapshot (operation 904). In other words, the differential location data structure may be updated with changes made to the virtual disk between the full snapshot and the differential snapshot. If additional (e.g., subsequent) differential snapshots are available (operation 906), the differential location data structure is updated with each differential snapshot (operation 904) to include changes stored in the differential snapshot. After the differential location data structure is updated with the last differential snapshot, the differential location data structure may be used as an up-to-date image of the virtual disk.

The description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for providing a virtual disk in a computer system, comprising:
    storing data for the virtual disk in a virtual disk file on the computer system, wherein the virtual disk file includes a data structure that comprises of at least a superblock, two or more checkpoint blocks, a set of metadata blocks and a set of data blocks, and wherein the superblock references the two or more checkpoint blocks, the two or more checkpoint blocks reference the set of metadata blocks and the set of metadata blocks reference the set of data blocks;
    loading a differential location data structure corresponding to a snapshot of the virtual disk into memory on the computer system, wherein the differential location data structure corresponds to an in-memory representation of the snapshot, wherein the differential location data structure maps blocks in the snapshot to the set of data blocks used by the snapshot in the virtual disk file, and wherein the differential location data structure is different from the data structure used in the virtual disk file;
    processing input/output (I/O) operations to the virtual disk using the differential location data structure and the virtual disk file, wherein the differential location data structure facilitates the processing of the I/O operations to the virtual disk file; and
    periodically generating a new snapshot of the virtual disk, wherein generating the new snapshot involves:
        allocating a space on the virtual disk file for storing metadata containing changes made to the differential location data structure;
        writing only the metadata containing changes made to the differential location data structure to the allocated space; and
        transactionally committing only the metadata containing changes to the differential location data structure by updating a checkpoint region in the virtual disk file to reference the allocated space that stores metadata containing changes to the differential location data structure.

2. The computer-implemented method of claim 1, further comprising resizing the virtual disk file based on free space on the virtual disk file or filesystem free space associated with a host filesystem on the computer system.

3. The computer-implemented method of claim 1, wherein each of the I/O operations corresponds to a read operation or a write operation.

4. The computer-implemented method of claim 3, wherein processing the read operation involves:
 locating a set of blocks requested in the read operation using the differential location data structure; and
 retrieving the blocks from the virtual disk file.

5. The computer-implemented method of claim 4, wherein processing the read operation further involves at least one of:
 individually decompressing compressed blocks;
 individually decrypting encrypted blocks; and
 individually checking a hash associated with hashed blocks.

6. The computer-implemented method of claim 3, wherein processing the write operation involves:
 allocating a space on the virtual disk file based on a block size associated with the write operation;
 executing the write operation by writing a block to the space; and
 updating the differential location data structure using the block.

7. The computer-implemented method of claim 6, wherein processing the write operation further involves at least one of:
 compressing the block;
 encrypting the block; and
 computing a hash associated with the block.

8. The computer-implemented method of claim 1, wherein loading the differential location data structure into the memory involves:
 populating the differential location data structure in the memory with a most recent full snapshot of the virtual disk from the virtual disk file; and
 updating the differential location data structure with one or more differential snapshots of the virtual disk generated after the most recent full snapshot.

9. The computer-implemented method of claim 1, wherein the virtual disk comprises a virtual computing environment executing on the computer system.

10. A system for providing a virtual disk in a 2 computer system, comprising:
 a processor coupled to a memory:
 a virtual disk file comprising data for the virtual disk, wherein the virtual disk file includes a data structure that comprises of at least a superblock, two or more checkpoint blocks, a set of metadata blocks and a set of data blocks, and
 wherein the superblock references the two or more checkpoint blocks, the two or more checkpoint blocks reference the set of metadata blocks and the set of metadata blocks reference the set of data blocks;
 a differential location data structure corresponding to a snapshot of the virtual disk;
 an interceptor configured to process input/output (I/O) operations to the virtual disk using the differential location data structure and the virtual disk file, wherein the differential location data structure facilitates the processing of the I/O operations to the virtual disk file; and
 a disk emulator configured to:
  load the differential location data structure into memory on the computer system, wherein the differential location data structure corresponds to an in-memory representation of the snapshot, wherein the differential location data structure maps blocks in the snapshot to the set of data blocks used by the snapshot in the virtual disk file, and wherein the differential location data structure is different from the data structure used in the virtual disk file; and
  periodically generate a new snapshot of the virtual disk, wherein generating the new snapshot involves allocating a space on the virtual disk file for storing metadata containing changes made to the differential location data structure, writing only the metadata containing changes to the allocated space, and transactionally committing only the changes to the differential location data structure by updating a checkpoint region in the virtual disk file to reference the allocated space that stores metadata containing changes to the differential location data structure.

11. The system of claim 10, wherein each of the I/O operations corresponds to a read operation or a write operation.

12. The system of claim 11, wherein processing the read operation involves:
 locating a set of blocks requested in the read operation using the differential location data structure; and
 retrieving the blocks from the virtual disk file.

13. The system of claim 11, wherein processing the write operation involves:
 allocating a space on the virtual disk file based on a block size associated with the write operation;
 executing the write operation by writing a block to the space; and
 updating the differential location data structure using the block.

14. The system of claim 10, wherein loading the differential location data structure into the memory involves:
 populating the differential location data structure in the memory with a most recent full snapshot of the virtual disk from the virtual disk file; and
 updating the differential location data structure with one or more differential snapshots of the virtual disk generated after the most recent full snapshot.

15. A non-transitory computer-readable storage medium storing instructions that when executed by a computer cause the computer to perform a method for providing a virtual disk in a computer system, the method comprising:
 storing data for the virtual disk in a virtual disk file on the computer system, wherein the virtual disk file includes a data structure that comprises of at least a superblock, two or more checkpoint blocks, a set of metadata blocks and a set of data blocks, and wherein the superblock references the two or more checkpoint blocks, the two or more checkpoint blocks reference the set of metadata blocks and the set of metadata blocks reference the set of data blocks;
 loading a differential location data structure corresponding to a snapshot of the virtual disk into memory on the computer system, wherein the differential location data structure corresponds to an in-memory representation of the snapshot, wherein the differential location data structure maps blocks in the snapshot to the set of data blocks used by the snapshot in the virtual disk file, and wherein the differential location data structure is different from the data structure used in the virtual disk file;
 processing input/output (I/O) operations to the virtual disk using the differential location data structure and the virtual disk file, wherein the differential location data structure facilitates the processing of the I/O operations to the virtual disk file; and periodically generating a new snapshot of the virtual disk, wherein generating the new snapshot involves:

allocating a space on the virtual disk file for storing metadata containing changes made to the differential location data structure;

writing only the metadata containing changes to the allocated space; and transactionally committing only the metadata containing changes to the differential location data structure by updating a checkpoint region in the virtual disk file to reference the allocated space that stores metadata containing changes to the differential location data structure.

16. The non-transitory computer-readable storage medium of claim 15, wherein each of the I/O operations corresponds to a read operation or a write operation.

17. The non-transitory computer-readable storage medium of claim 16, wherein processing the read operation involves:

locating a set of blocks requested in the read operation using the differential location data structure; and retrieving the blocks from the virtual disk file.

18. The non-transitory computer-readable storage medium of claim 16, wherein processing the write operation involves:

allocating a space on the virtual disk file based on a block size associated with the write operation;

executing the write operation by writing a block to the space; and updating the differential location data structure using the block.

* * * * *